Feb. 24, 1925.
J. EATON
1,527,636
REVERSING MOTOR CONTROL
Filed April 25, 1922
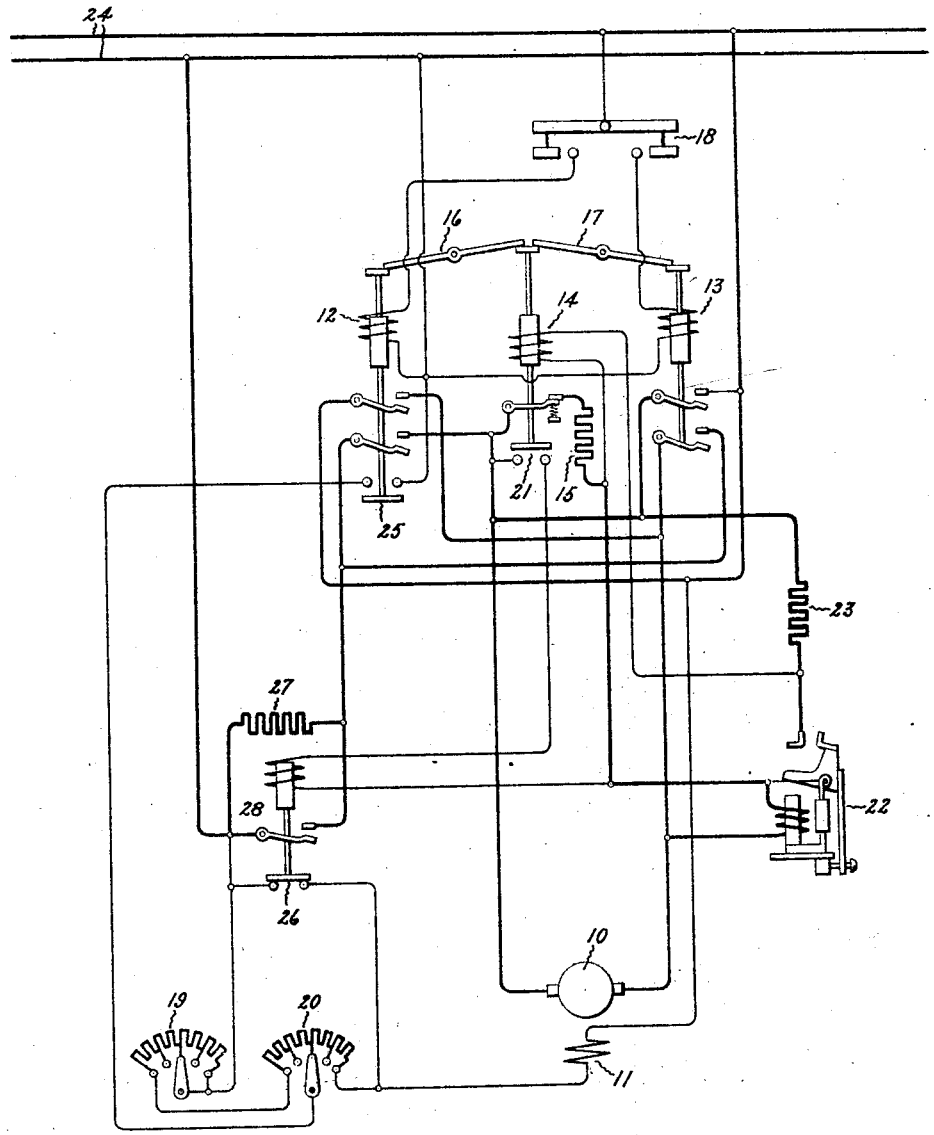
Inventor:
John Eaton,
by *Albert D...*
His Attorney.

Patented Feb. 24, 1925.

1,527,636

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

REVERSING MOTOR CONTROL.

Application filed April 25, 1922. Serial No. 556,482.

*To all whom it may concern:*

Be it known that I, JOHN EATON, a subject of the British Empire, residing at Schenectady, county of Schenectady, State of New York, have invented certain new and useful Improvements in Reversing Motor Controls, of which the following is a specification.

One of the objects of the invention is to provide a smooth reversal of a machine which is reversed by reversing the driving motor.

Where a machine is operated in a forward and return direction by a reversible electric motor, it is common practice to operate the driving motor as a braking generator to bring the driven machine substantially to rest in one direction by dynamic braking before applying power to the motor to cause the same to operate the machine in the other direction. Interlocking connections are provided whereby the dynamic brake circuit cannot be established unless the connection to the source of supply is open and the connection to the source can not be re-established until the dynamic braking effect has substantially ceased. Such arrangements have heretofore been such that when the dynamic brake circuit is opened preparatory to operation in the other direction, the driving motor is disconnected from the power supply for an interval. During this interval there is nothing to prevent the gearing between the motor and the machine to get on opposite faces of contact so that when power is applied to the motor there may be a distinct knock occasioned by the impact of the teeth of the gearing for driving in the desired direction.

One of the objects of my invention is to obviate the knocks upon the reversal of the machine.

A reversible motor driven planer is one class of machine to which the invention may be applied to great advantage, but the invention is not limited to its use in the control of planers, since the invention is applicable generally where a smooth reversal of a motor driven machine is desired.

In carrying the invention into effect in one form, a dynamic braking circuit about the motor armature is maintained during the interval of reversal and the motor is connected to the source for operation in the reverse direction with the dynamic braking effect maintained until the current through the motor armature has reversed. The transition from operation in one direction to the other direction is thus accomplished in a smooth and easy manner.

For a better understanding of the invention, reference is had to the accompanying drawing wherein I have illustrated the invention in a control primarily intended for a reversible planer, for the purpose of explaining the principles of the invention.

Referring to the drawing, the electric driving motor of the direct current type has an armature 10 and a shunt field 11. This driving motor is connected through suitable gearing (not shown) to drive a machine which is intended to be operated in the forward and reverse direction, for example, a planer. The motor is operated in the forward and reverse directions under the control of the pair of reversing switches 12 and 13, the electromagnetic reversing switch 12 being provided for the forward direction of operation and the electromagnetic reversing switch 13 for the reversing direction of machine operation. The normally closed electromagnetic switch 14 is provided for establishing a dynamic brake circuit for the motor armature through the resistor 15 during the interval between the opening of one of the reversing switches and the closing of the other in order to bring the motor substantially to rest before energizing the same for the other direction of operation.

The electromagnetic switches or contactors 12, 13 and 14 are connected by means of the pivoted mechanical interlocks 16 and 17 so that the closing of either of the reversing switches will open the dynamic brake circuit contactor 14 and when the dynamic brake circuit contactor 14 is held closed by its electromagnet neither of the reversing contactors 12 and 13 can be closed. The direction of operation of the driving motor is under the control of the reversing master controller 18 which controls the windings of the reversing contactors 12 and 13.

The adjustable rheostats 19 and 20 are provided for regulating the speed of the motor for the forward and return directions; that is, only a selected portion of the rheostat 20 is in the shunt field circuit of the motor for the forward direction and all of the rheostat 20 and a portion of the rheostat 19 are included in the shunt field circuit of the motor for the return direction so that the return operation may be faster than the forward operation. As applied to a planer, this means that the cut will be taken at a materially lower speed than the return speed of the planer, preparatory to taking another cut.

The arrangement thus far described is old and well understood by those skilled in the art. The accelerating resistor 27 is provided for limiting the rush of current in the motor armature circuit when the motor armature is first connected to the source of supply. The contactor 28 is provided for controlling this resistor and the winding of this contactor is energized responsively to the generated or counter-electromotive force of the motor so that when the motor speed has increased to a pre-determined value this contactor will close and short circuit the resistor 27, thus connecting the motor armature directly to the supply circuit. The winding of the contactor 28 is under the control of the dynamic brake contactor 14, and for this purpose an auxiliary switch 21 is provided on the contactor 14 and arranged so that this auxiliary switch is closed when the dynamic brake contactor is opened. In order to insure that there will be a dynamic braking effect on the motor in the interval between the opening of the dynamic brake contactor 14 and the closing of the reversing contactor which is next to be closed, I have provided the electromagnetic switch 22 which controls another dynamic brake circuit which includes the resistor 23. The switch 22 is of the well known series lock-out type arranged to be held open magnetically when the current in the magnet winding is comparatively high and to close magnetically and to be held closed magnetically when the current in the magnet winding has been reduced to a predetermined value.

As thus constructed and arranged, and with the parts in their respective positions shown in the drawing, the operation of my invention is as follows. The master switch will be thrown to the right, assuming that the forward direction of operation is first desired, thereby energizing the winding of the reversing contactor 12. When this contactor closes it opens the dynamic brake contactor 14 and connects the motor armature to the source of supply 24, through a circuit including the accelerating resistor 27, the lower main contacts of the reversing contactor 12, the motor armature 10, through the upper main contacts of the contactor 12 to the other conductor of the supply circuit. The auxiliary switch 25 associated with the reversing contactor 12 establishes a short circuit around the field resistor 19 and the part of the field rheostat 20 determined by the setting of the contact member of the rheostat. Both rheostats 19 and 20 are shorted through the auxiliary switch 26. The motor is started full field by reason of the fact that the rheostats 19 and 20 are short circuited by the auxiliary switch 26 associated with the accelerating contactor 28. When the speed of the motor has increased to the pre-determined value the accelerating contactor 28 closes thereby short circuiting the accelerating resistor 27 and including the part of the rheostat 20 determined by the setting of the rheostat in the shunt field of the motor.

The motor will operate at the speed determined by the setting of the rheostat 20 until the master switch 18 is operated to deenergize the reversing contactor 12 and energize the reversing contactor 13. Because of the fact that the dynamic brake contactor 14 is energized responsively to the generated potential of the motor, when the contactor 12 opens, the dynamic brake contactor 14 will be closed and maintained closed against the action of the contactor 13 tending to force the dynamic brake contactor 14 open. The motor is now included in a dynamic brake circuit which includes the resistor 15, the full field connection of the motor is restored, and the speed of the motor is thereby reduced.

The winding of the series lock-out contactor 22 is included in this dynamic brake circuit and the switch member thereof will be magnetically held in the open position until the current in the brake circuit has been reduced to a predetermined value. When this happens the series contactor 22 will close, thereby establishing another dynamic brake circuit for the motor armature, including the resistor 23, the resistance value of which may be such that the braking effect on the motor is temporarily increased. The closing of the series contactor 22 also short circuits the winding of the dynamic brake contactor 14 so that the contactor 14 will be permitted to open and the reversing contactor 13 to close. The series contactor 22 will be maintained closed during the interval between the opening of the dynamic brake contactor 14 and the closing of the reversing contactor 13 and the reversal of the motor will thereby be accomplished in a smooth and easy manner without producing a knock in the machine previously referred to. That is because of the fact that there is a local circuit about the motor armature which is maintained until after the contactor 13 closes. When the current in the motor armature circuit has either dropped to a low value or has reversed due to the closing of the reversing contactor 13, the series contactor 22 will open, thereby opening the shunt circuit around the motor armature.

The motor will operate in the return direction at a higher speed than in the forward direction because of the fact that all of the rheostat 20 and a part of the rheostat 19 are included in the shunt field circuit of the motor when the contactor 28 closes to short circuit the accelerating resistor 27.

The equipment operates to effect a smooth reversal of the motor for each direction of operation, in the manner previously explained, the series contactor 22 serving to maintain the braking effect on the motor during the interval between the opening of the dynamic brake contactor 14 and the closing of either one of the reversing switches 12 or 13.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. A system of motor control comprising switch mechanism for connecting the motor to a source of supply for forward and reverse operation, a dynamic braking circuit for the motor, and electro-responsive means for establishing said braking circuit upon the operation of the switch mechanism to disconnect the motor from the source, and for maintaining a dynamic braking effect until after the said switch mechanism operates to reverse the motor connections.

2. A system of motor control comprising reversing switch mechanism for the motor, a dynamic brake circuit switch which is closed during the intervals between reversals of the motor when the said reversing switch mechanism is open and which is opened by the closing of the reversing switch mechanism, and means for maintaining a braking effect on the motor during the interval between the opening of the said dynamic brake circuit switch and the closing of the said reversing switch mechanism.

3. A system of motor control comprising a pair of separately operable reversing switches, means for establishing a dynamic brake circuit for the motor, connections between the said reversing switches and the said means for preventing the establishment of the dynamic brake circuit in case either of said switches is closed and for preventing either of said switches from closing in case the dynamic brake circuit is closed, and means for maintaining a dynamic braking effect on the motor during the interval between the opening of the said dynamic brake circuit and the closing of one of the said switches.

4. A system of motor control comprising a pair of separately operable reversing switches, a normally closed switch for establishing a dynamic brake circuit for said motor, connections between the said reversing switches and the said dynamic brake circuit switch for opening the dynamic brake circuit switch responsively to the closing of either of said reversing switches, and means for establishing another dynamic brake circuit for the motor and maintaining the same during the interval between the opening of the said dynamic brake circuit switch and the closing of a reversing switch.

5. A system of motor control comprising a pair of reversing switches for the motor, an electro-responsive switch energized responsively to a condition of the motor for establishing a dynamic brake circuit for the motor, means for preventing the closing of the said brake circuit switch when either of said reversing switches is closed and for preventing the closing of either of said reversing switches until the said brake circuit switch is opened, and means energized responsively to the current in the said dynamic brake circuit for effecting the opening of the said dynamic brake circuit switch to permit one of the said reversing switches to close and for maintaining a braking effect on the motor during the interval between the opening of the said dynamic brake circuit switch and the closing of one of the reversing switches.

6. A system of motor control comprising a reversible electric motor, a pair of reversing switches for the motor, a normally closed electromagnetic switch which is maintained closed responsively to the generated potential of the motor for establishing a dynamic brake circuit for the motor, means for preventing the closing of the said brake circuit switch when either of said reversing switches is closed and for preventing the closing of either of said reversing switches until the said brake circuit switch is open, and a normally open electromagnetic switch energized to close responsively to the dynamic braking current of the motor for deenergizing the said dynamic brake circuit switch to permit one of said reversing switches to close, and for establishing another dynamic brake circuit for the motor which is maintained during the interval between the opening of the said dynamic braking circuit switch and the closing of one of the reversing switches.

7. The method of reversing an electric motor which comprises producing a dynamic braking effect in the motor during the interval the motor is disconnected from the source of supply for operation in one direction and until after the motor is connected to the source of supply for operation in the opposite direction.

8. The method of reversing an electric motor which comprises producing a dynamic braking effect in the motor as soon as the motor is disconnected from the source of supply for operation in one direction and maintaining a dynamic braking effect until after the motor is connected to the source of supply for operation in the opposite direction.

9. The method of reversing an electric motor which comprises establishing a dynamic brake circuit for the motor after the motor is disconnected from the source of supply for operation in one direction, establishing a second dynamic brake circuit, opening the first brake circuit and closing the connection of the motor to the source of supply for operation in the opposite direction, and then opening the second brake circuit an interval after the connection to the source is closed for operation in the opposite direction.

10. The method of reversing an electric motor which comprises establishing a dynamic brake circuit after the motor is disconnected from the source of supply for operation in one direction, maintaining the said brake circuit established until after the motor is connected to the source of supply for operation in the opposite direction and the current in the brake circuit is below a predetermined value, and then opening the brake circuit.

11. The method of reversing an electric motor which comprises establishing a dynamic brake circuit after the motor is disconnected from the source of supply for operation in one direction, maintaining the said brake circuit closed until the current in the brake circuit is below a predetermined value, establishing a second brake circuit, opening the first brake circuit and closing the connection of the motor to the source of supply for operation in the opposite direction, and maintaining the second brake circuit until after the connection to the source for the opposite direction is established and the current in the second brake circuit has dropped to a predetermined value.

In witness whereof I have hereunto set my hand this 24th day of April, 1922.

JOHN EATON.